United States Patent
Connor

(10) Patent No.: US 10,578,726 B2
(45) Date of Patent: Mar. 3, 2020

(54) ACTIVE SENSING SYSTEM AND METHOD OF SENSING WITH AN ACTIVE SENSOR SYSTEM

(71) Applicant: Sikorsky Aircraft Corporation, Stratford, CT (US)

(72) Inventor: Michael Aaron Connor, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 239 days.

(21) Appl. No.: 15/184,366

(22) Filed: Jun. 16, 2016

(65) Prior Publication Data
US 2017/0052276 A1    Feb. 23, 2017

Related U.S. Application Data

(60) Provisional application No. 62/206,561, filed on Aug. 18, 2015.

(51) Int. Cl.
*G01S 7/537* (2006.01)
*G01V 8/10* (2006.01)
(Continued)

(52) U.S. Cl.
CPC .............. *G01S 7/537* (2013.01); *G01S 7/023* (2013.01); *G01S 7/36* (2013.01); *G01S 7/495* (2013.01);
(Continued)

(58) Field of Classification Search
CPC  G01V 8/10; G01S 7/537; G01S 7/495; G01S 7/023; G01S 7/36; G01S 7/40; G01S 2007/4013
See application file for complete search history.

(56) References Cited

U.S. PATENT DOCUMENTS 6,119,067 A  *  9/2000  Kikuchi ................ G01S 7/4026
                                                   342/158
7,598,888 B2 * 10/2009  Matuska ................ G01C 5/005
                                                   340/945
(Continued)

FOREIGN PATENT DOCUMENTS

EP       2128646 A2    11/2011

OTHER PUBLICATIONS

Doerry, "Comments on radar interference sources and mitigation techniques", Optomechatronic Micro/Nano Devices and Components III: Oct. 8, 2007 (Proceedings of SPIE) May 2015, pp. 94611X1-94611X8, vol. 9461.

(Continued)

*Primary Examiner* — Que Tan Le
*Assistant Examiner* — Jennifer D Bennett
(74) *Attorney, Agent, or Firm* — Cantor Colburn LLP

(57) ABSTRACT

An active sensing system includes an agent and at least one sensor operatively associated with the agent. The at least one sensor includes one or more emitters configured and disposed to establish a sensing zone. A conflict identification module is configured and disposed to identify one or more sensor conflict regions, and an active sensor controller is operatively connected to the at least one sensor and the conflict identification module. The active sensor controller is configured and disposed to form an adjustment zone within the sensing zone to accommodate the one or more sensor conflict regions.

16 Claims, 2 Drawing Sheets

(51) Int. Cl.
*G01S 7/36* (2006.01)
*G01S 7/495* (2006.01)
*G01S 7/02* (2006.01)
*G01S 7/40* (2006.01)

(52) U.S. Cl.
CPC ............... *G01V 8/10* (2013.01); *G01S 7/40* (2013.01); *G01S 2007/4013* (2013.01)

(56) References Cited

U.S. PATENT DOCUMENTS

| | | | |
|---|---|---|---|
| 2002/0005942 A1* | 1/2002 | Perry | F41G 7/263 356/5.04 |
| 2006/0244978 A1* | 11/2006 | Yamada | G01S 7/481 356/614 |
| 2008/0140267 A1 | 6/2008 | Matuska et al. | |
| 2009/0289187 A1* | 11/2009 | Mian | G01S 17/89 250/330 |
| 2009/0299627 A1 | 12/2009 | Hasegawa | |
| 2011/0012510 A1* | 1/2011 | Tani | B60Q 1/1423 315/82 |
| 2015/0130644 A1 | 5/2015 | Kiel | |
| 2016/0006914 A1* | 1/2016 | Neumann | G06F 3/0325 348/78 |

OTHER PUBLICATIONS

Extended European Search Report dated Dec. 21, 2016 in related EP Patent Application No. 16184022.8, 11 pages.

Spencer et al., "RFI Characterization and Mitigation for the SMAP Radar", IEEE Transactions on Geoscience and Remote Sensing, Oct. 2013, pp. 4973-4982, vol. 51, No. 10.

Vfg 41 /2012: "Allgemeinzuteilung von Frequenzen fur Kraftfahrzeug-Kurzstreckenradare im Frequenzbereich 21,65- 26,65 GHz", Jul. 2012, retrieved from: https://www.bundesnetzagentur.de/SharedDocs/Downloads/DE/Sachgebiete/Telekommunikation/Unternehmen_Institutionen/Frequenzen/Allgemeinzuteilungen/2012_41_KfzKurzstreckenradar24GHz_pdf.pdf?blob=publicationFile&v=3, 3 pages.

* cited by examiner

ACTIVE SENSING SYSTEM AND METHOD OF SENSING WITH AN ACTIVE SENSOR SYSTEM

CROSS-REFERENCE TO RELATED APPLICATIONS

This application claims priority to U.S. Provisional Application No. 62/206,561, which was filed on Aug. 18, 2015. The contents of U.S. Provisional Application No. 62/206,561 are incorporated herein by reference.

BACKGROUND

Exemplary embodiments pertain to the art of sensors and, more particularly to an active sensor system and a method of sensing with an active sensor system.

Sensors, both passive and active, are employed on both stationary and moving platforms to detect various objects, signals, environmental conditions, and the like. Active sensors typically transmit electromagnetic radiation into an environment. The electromagnetic radiation reflects off of objects in the environment. Reflected radiation is then measured by the active sensor providing data about the objects.

BRIEF DESCRIPTION

Disclosed is an active sensing system including an agent and at least one sensor operatively associated with the agent. The at least one sensor includes one or more emitters configured and disposed to establish a sensing zone. A conflict identification module is configured and disposed to identify one or more sensor conflict regions, and an active sensor controller is operatively connected to the at least one sensor and the conflict identification module. The active sensor controller is configured and disposed to form an adjustment zone within the sensing zone to accommodate the one or more sensor conflict regions.

In addition to one or more of the features described above or below, or as an alternative, further embodiments could include a database module including location-based radiation sensitivity information for the one or more sensor conflict regions, the active sensor controller being configured and disposed to apply the database module to adjust the sensing zone based on the location-based radiation sensitivity information.

In addition to one or more of the features described above or below, or as an alternative, further embodiments could include an agent/sensor state module configured and disposed to determine an orientation of the sensing zone relative to the agent.

In addition to one or more of the features described above or below, or as an alternative, further embodiments could include a sensor model module operatively connected to the active sensor controller, the sensor model module providing a virtual model of electromagnetic radiation as projected from the one or more emitters within the sensing zone.

In addition to one or more of the features described above or below, or as an alternative, further embodiments could include wherein the agent is configured and disposed to move relative to the one or more sensor conflict regions.

In addition to one or more of the features described above or below, or as an alternative, further embodiments could include wherein the agent comprises a rotary wing aircraft.

Also disclosed is a method of sensing with an active sensing system. The method includes activating at least one sensor having one or more sensor emitters to establish a sensing zone, directing the sensing zone from an agent supporting the sensor toward an area to be sensed, identifying a conflict region in the area to be sensed, and operating the at least one sensor to establish an adjustment zone within the sensing zone for the conflict region.

In addition to one or more of the features described above or below, or as an alternative, further embodiments could include displaying the sensing zone and the conflict region relative to the area to be sensed.

In addition to one or more of the features described above or below, or as an alternative, further embodiments could include operating the sensor to establish the adjustment zone includes accessing a database for details of the conflict region.

In addition to one or more of the features described above or below, or as an alternative, further embodiments could include determining a position of the sensing zone relative to the agent and the area to be sensed.

In addition to one or more of the features described above or below, or as an alternative, further embodiments could include operating the sensor to establish the adjustment zone includes applying directional limitations to at least one of the one or more sensor emitters.

In addition to one or more of the features described above or below, or as an alternative, further embodiments could include operating the sensor to establish the adjustment zone includes inhibiting at least one of the one or more sensor emitters.

In addition to one or more of the features described above or below, or as an alternative, further embodiments could include operating the sensor to establish the adjustment zone includes applying power limitations to at least one of the one or more sensor emitters.

In addition to one or more of the features described above or below, or as an alternative, further embodiments could include operating the sensor to establish the adjustment zone includes applying spectral limitations to at least one of the one or more sensor emitters.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
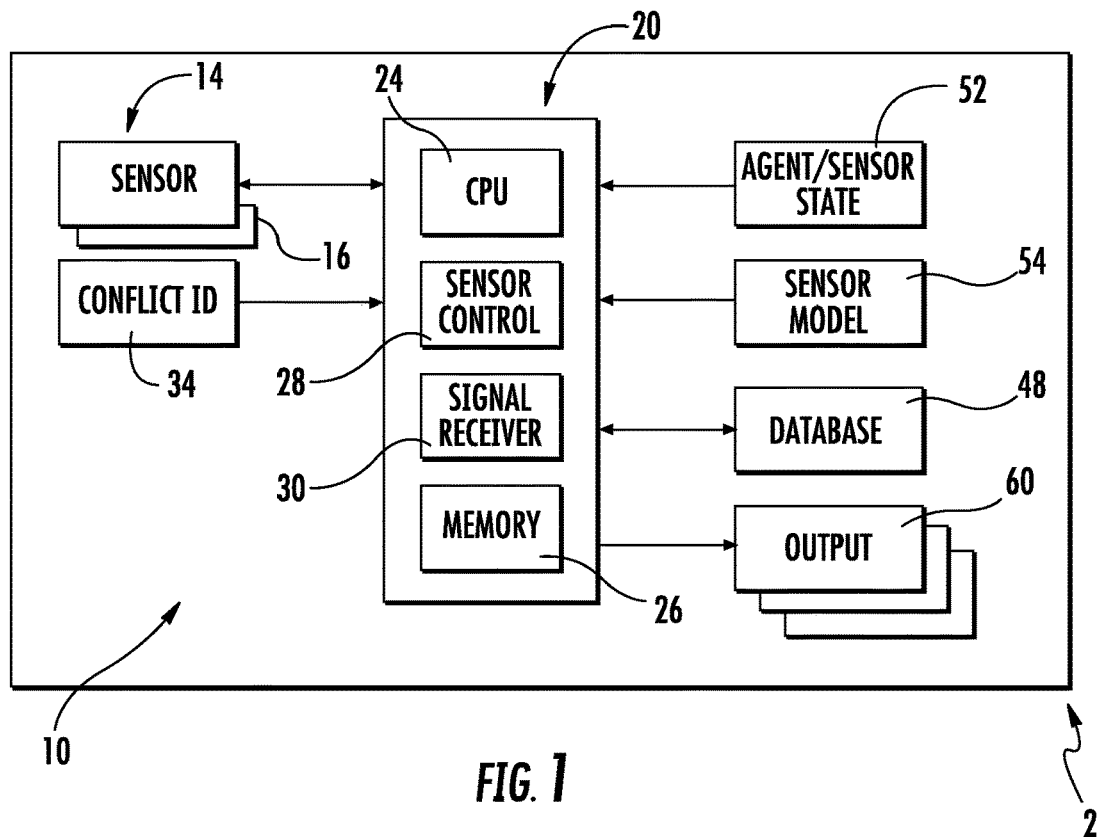
FIG. 1 is a block diagram depicting an agent having an active sensor system, in accordance with an exemplary embodiment.
Figure 2:
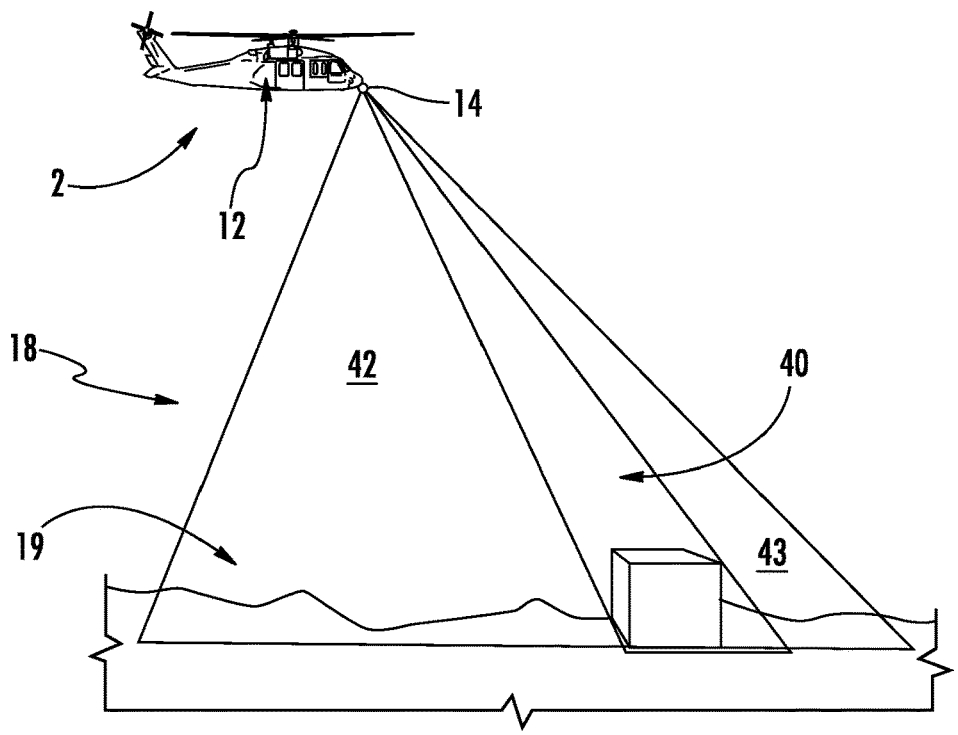
FIG. 2 is a schematic view of the active sensor system scanning an area having a conflict region, in accordance with an aspect of an exemplary embodiment.

An agent 2 includes an active sensing system 10 in accordance with an exemplary embodiment illustrated in FIGS. 1-2. Agent 2 may take the form of a rotary wing aircraft 12 as shown in FIG. 2. Of course, it should be understood that agent 2 may take on a variety of forms including land based systems, air based systems and sea based systems. Further, agent 2 may take the form of a stationary system or a mobile system depending on various scanning goals.

In accordance with an aspect of an exemplary embodiment, active sensing system 10 includes one or more active sensors 14 each having associated one or more emitters 16. Emitters 16 send out a sensing field that forms a sensing zone 18 onto an area to be sensed 19. All or a portion of the sensing field may be reflected back to the agent 2, to determine various parameters of area to be sensed 19. In further accordance with an aspect of an exemplary embodiment, active sensing system 10 includes an active sensor controller 20 having a central processing unit (CPU) 24 and a memory 26. Memory 26 may have stored thereon a set of instructions for operating active sensing system 10. A sensor controller 28, which selectively activates one or more of active sensors 14 is operatively connected to active sensor controller 20. Likewise, a signal receiver 30 that may receive reflections of the sensing field may also be operatively connected to active sensor controller 20.

In accordance with another aspect of an exemplary embodiment, active sensor system 10 includes a conflict identification module 34 operatively connected to active sensor controller 20. Conflict identification module 34 identifies potential sensor conflicts within area to be sensed 19. Sensor conflicts may include structures, systems, or the like that may be sensitive to being sensed, have an ability to detect sensing, or the like. In accordance with an aspect of an exemplary embodiment, conflict identification module 34 establishes a conflict region 40 within area to be sensed 19. Conflict region 40 may be flanked by a first sensing region 42 and a second sensing region 43, may be surrounded by a sensing region or the like. As will be discussed more fully below, active sensor controller 20 receives information from a database module 48 to determine how to accommodate the conflict region 40. Database module 48 includes location-based radiation sensitivity data that may be employed to determine whether a conflict might exist. Database module 48 may be selectively updated real-time through various up-links (not shown).

In further accordance with an aspect of an exemplary embodiment, active sensing system 10 includes an agent/sensor state module 52 which determines and, together with a sensor model module 54, models a position of sensing zone 18 relative to agent 2. Agent/sensor state module 52 may output a visual depiction of sensing zone 18 overlaid onto area to be sensed 19 coupled with any conflict regions 40. More specifically, sensor model module 54 provides a virtual depiction of a specific radiation projection pattern, including intensity, frequency, and directional attributes of electromagnetic radiation projected from one or more sensors of active sensing system 10. Sensor model module 54 applies database module 48 to the radiation projection pattern to identify potential conflicts. The visual depiction may be presented on an output device 60 such as a screen viewable by a user. Additional outputs (not shown) may provide data regarding area to be sensed 19 identified by signal receiver 30.

Figure 3:
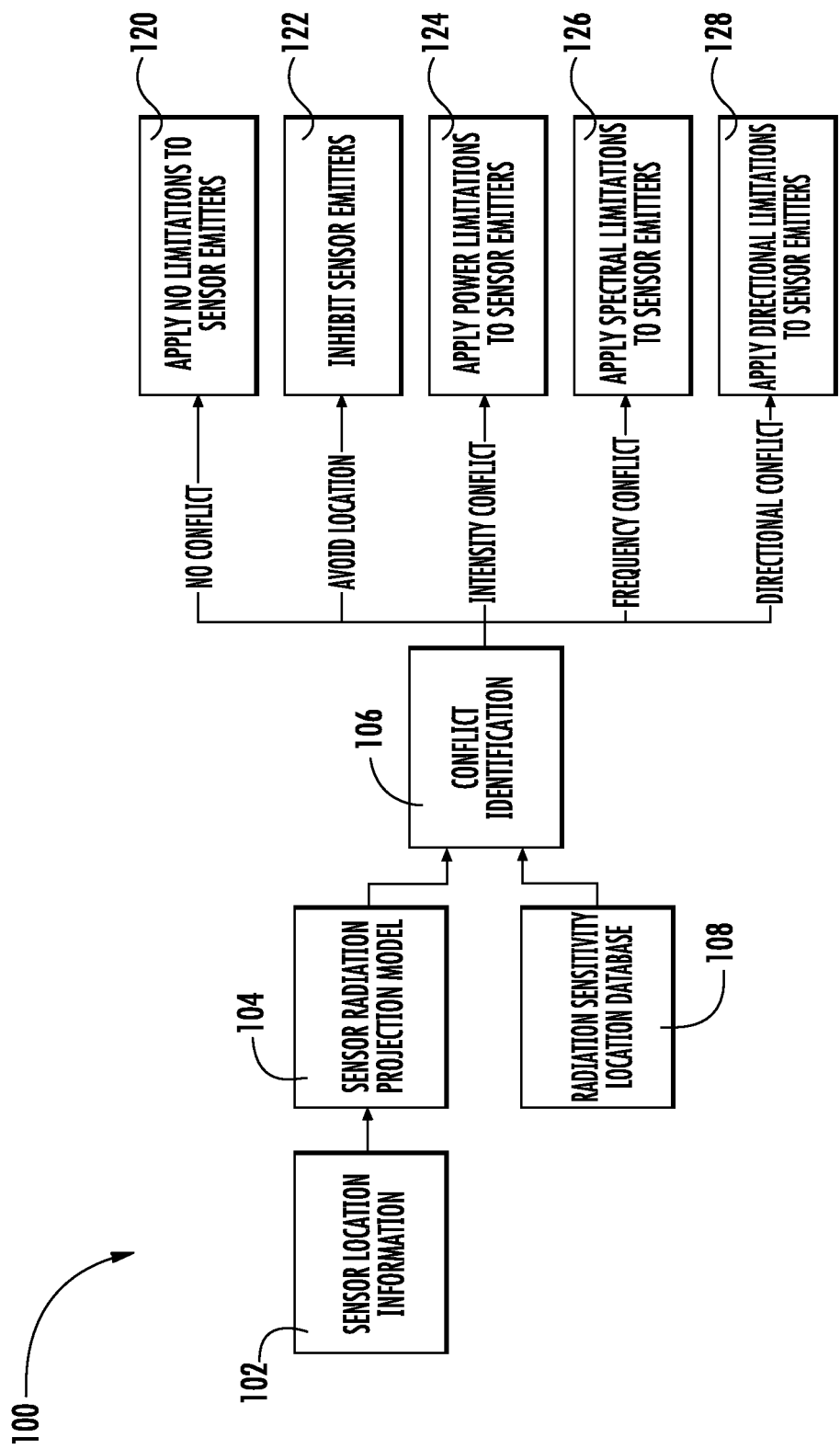
FIG. 3 depicts a method of actively scanning an area having a conflict region, in accordance with an aspect of an exemplary embodiment.

Reference will now follow to FIG. 3 in describing a method 100 of actively sensing an area to be sensed 19 that may include a conflict region 40. In block 102, sensor location information is gathered by agent/sensor state module 52, and a sensor radiation projection model is formed by sensor model module 54 in block 104. Sensor radiation projection model data is passed to conflict identification module 34 in block 106. Conflict identification module 34 may apply database module 48, in block 108, with radiation sensitivity information in order to identify and/or determine a response to any perceived region of conflict as will be detailed below.

If no conflicts exist, active sensor controller 20 does not apply any limitations to active sensors 14, as seen in block 120. If conflict identification module 34 identifies a location conflict, active sensor controller 20 may inhibit emitters 16 in the conflict region 40, as shown in block 122, to preclude emitting radiation towards a radiation sensitive area. If conflict identification module 34 identifies an intensity conflict, active sensor controller 20 may apply power limitations, including providing partial or no power to emitters 16 in the conflict region 40 as shown in block 124. If conflict identification module 34 identifies a frequency conflict, active sensor controller 20 may apply spectral limitations to emitters 16 in the conflict region 40 as shown in block 126. If conflict identification module 34 identifies a directional conflict, active sensor controller 20 may apply directional limitations to emitters 16 in the conflict region 40 as shown in block 128.

At this point, it should be understood that the exemplary embodiments provide a system for controlling an active sensor to scan a region of interest while avoiding conflicts. The conflicts could take on a variety of forms and sensor responses to avoid conflicts. In this manner, the system may scan regions about a conflict without ever encroaching on a conflict region.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An active sensing system comprising:
    an agent;
    at least one sensor operatively associated with the agent, the at least one sensor including one or more emitters configured and disposed to establish a sensing zone;
    a conflict identification module configured and disposed to identify one or more sensor conflict regions including one or more objects sensitive to being sensed; and
    an active sensor controller operatively connected to the at least one sensor and the conflict identification module, the active sensor controller being configured and disposed to form an adjustment zone of the at least one sensor within the sensing zone to accommodate the one or more sensor conflict regions, the adjustment zone defining a portion of the sensing zone at which the one or more emitters are directed that is less than an entirety of the sensing zone to avoid directing the one or more emitters toward the conflict region.

2. The active sensing system according to claim 1, further comprising a database module including location-based radiation sensitivity information for the one or more sensor conflict regions, the active sensor controller being configured and disposed to apply the database module to adjust the sensing zone based on the location-based radiation sensitivity information.

3. The active sensing system according to claim 1, further comprising: an agent/sensor state module configured and disposed to determine an orientation of the sensing zone relative to the agent.

4. The active sensing system according to claim 1, further comprising: a sensor model module operatively connected to the active sensor controller, the sensor model module providing a virtual model of electromagnetic radiation projected from the one or more emitters within the sensing zone.

5. The active sensing system according to claim 1, wherein the agent is configured and disposed to move relative to the one or more sensor conflict regions.

6. The active sensing system according to claim 5, wherein the agent comprises a rotary wing aircraft.

7. The active sensing system according to claim 1, wherein the adjustment zone is surrounded by the sensing zone.

8. A method of sensing with an active sensing system, the method comprising:
   activating at least one sensor having one or more sensor emitters to establish a sensing zone;
   directing the sensing zone from an agent supporting the sensor toward an area to be sensed;
   identifying a conflict region including one or more objects sensitive to being sensed in the area to be sensed; and
   operating the at least one sensor to establish an adjustment zone within the sensing zone for the conflict region, the adjustment zone defining a portion of the sensing zone that is less than an entirety of the sensing zone to avoid directing the one or more sensor emitters toward the conflict region.

9. The method of claim 8, further comprising: displaying the sensing zone and the conflict region relative to the area to be sensed.

10. The method of claim 8, wherein operating the sensor to establish the adjustment zone includes accessing a database for details of the conflict region.

11. The method of claim 8, further comprising: determining a position of the sensing zone relative to the agent and the area to be sensed.

12. The method of claim 8, wherein operating the sensor to establish the adjustment zone includes applying directional limitations to at least one of the one or more sensor emitters.

13. The method of claim 8, wherein operating the sensor to establish the adjustment zone includes inhibiting at least one of the one or more sensor emitters.

14. The method of claim 8, wherein operating the sensor to establish the adjustment zone includes applying power limitations to at least one of the one or more sensor emitters.

15. The method of claim 8, wherein operating the sensor to establish the adjustment zone includes applying spectral limitations to at least one of the one or more sensor emitters.

16. The method of claim 8, wherein operating the at least one sensor to establish the adjustment zone includes creating an adjustment zone that is surrounded by the sensing zone for the conflict region.

\* \* \* \* \*